United States Patent [19]

Thoma et al.

[11] Patent Number: 5,609,816
[45] Date of Patent: Mar. 11, 1997

[54] PROCESS AND DEVICE FOR PREPARING A MOLDING

[75] Inventors: Wulf Thoma, Lisberg; Ekkehard Labitzke, Hilden, both of Germany

[73] Assignee: Schaeffler Teppichboden GmbH, Bamberg, Germany

[21] Appl. No.: 639,778

[22] Filed: Apr. 29, 1996

[30] Foreign Application Priority Data

Jun. 9, 1995 [DE] Germany ............... 195 21127.8

[51] Int. Cl.$^6$ ............................................. B29C 35/02
[52] U.S. Cl. ........................ 264/517; 264/122; 425/80.1; 425/406; 425/416
[58] Field of Search ..................... 264/517, 122; 425/80.1, 406, 416

[56] References Cited

U.S. PATENT DOCUMENTS

| | | | |
|---|---|---|---|
| 4,568,581 | 2/1986 | Peoples, Jr. ............... | 264/122 |
| 5,028,374 | 7/1991 | Imao et al. ............... | 264/517 |
| 5,366,678 | 11/1994 | Nomizo et al. ............... | 264/126 |

FOREIGN PATENT DOCUMENTS

| | | |
|---|---|---|
| 9312868 | 12/1993 | Germany. |
| WO91/18828A1 | 6/1991 | WIPO. |

*Primary Examiner*—Mary L. Theisen
*Attorney, Agent, or Firm*—McGlew and Tuttle

[57] ABSTRACT

In a process for preparing a molding from fibers and/or flakes and thermoplastic binder, the material is introduced into a mold, compacted, and bonded by thermal effect. To make it possible to introduce the material rapidly and such that a consistently equal density or a density changing in a defined pattern will be obtained, a filling contour calculated for the given molding is formed by a first mold disk set. After filling the filling contour, a first finished contour mold is positioned against it. A second mold disk set, whose disks are displaceable between the disks of the first mold disk set and form the second finished contour of the molding, is subsequently displaced in the first mold disk set against the first finished contour mold, while the material present in the filling contour is compacted. The material is subsequently fixed by thermal effect.

11 Claims, 2 Drawing Sheets

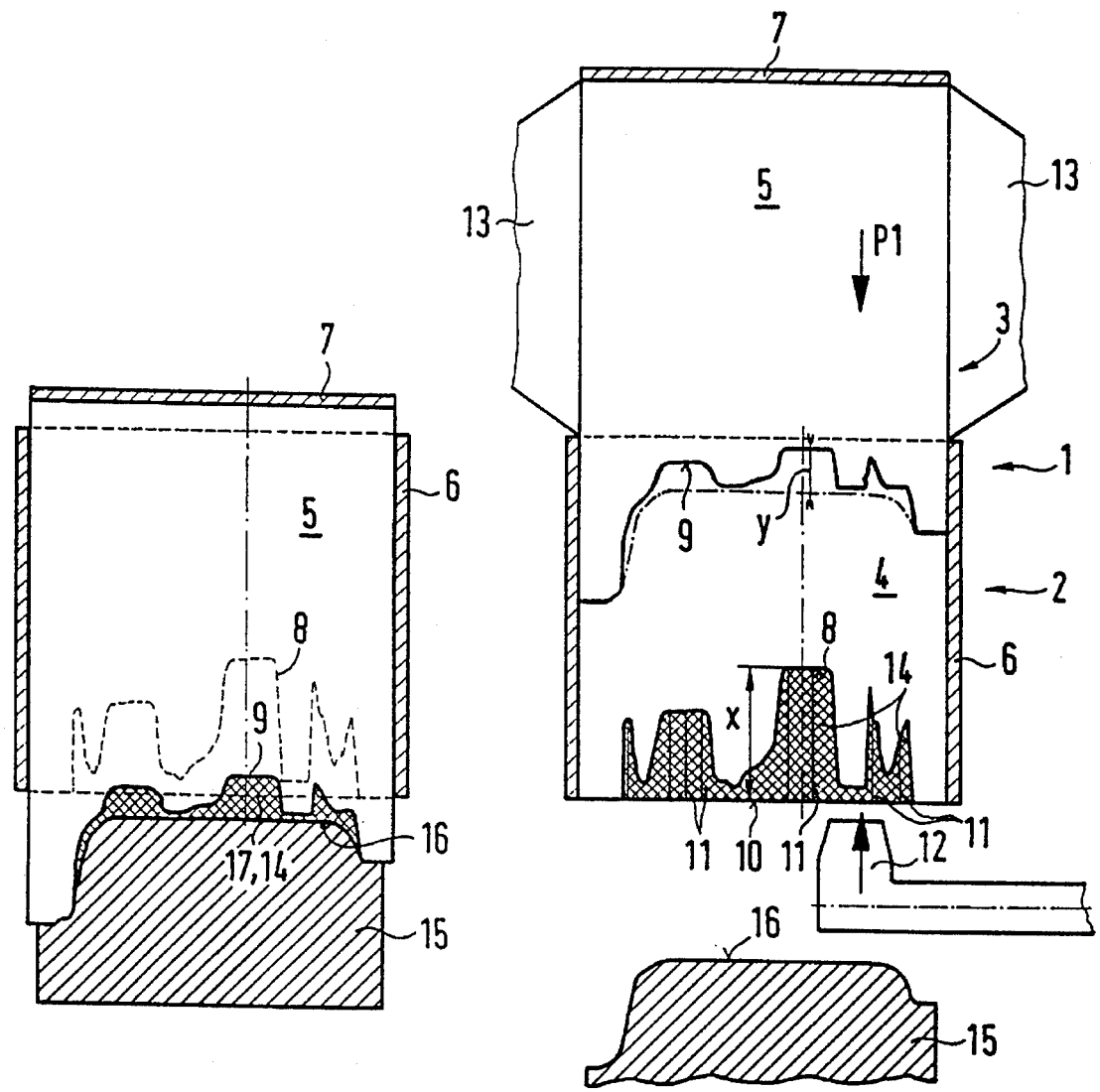

PROCESS AND DEVICE FOR PREPARING A MOLDING

FIELD OF THE INVENTION

The present invention pertains to a process for preparing a molding, especially a vehicle lining part from a fibrous material, e.g., cotton or plastic, and/or foam flakes, and a thermoplastic binder, such as binding fibers and/or binding powder, wherein the material is introduced into a molding tool, compacted, and bonded under the effect of heat.

BACKGROUND OF THE INVENTION

Such a molding lines, e.g., the floor space of a motor vehicle. Its lower finished contour is adapted to the contour of the floor panel as well as to the built-in parts (ventilation, cables, etc.) of the vehicle. Its upper finished contour is covered, e.g., with a carpet. The molding compensates the differences in the shapes of the floor panel and the carpet. In addition, it is used for sound insulation and heat insulation. Cotton and synthetic fibers and flakes or a mixture thereof may be used as the material for the molding. A certain binding of this material already takes place during the introduction of the material into the mold, because the fibers or flakes get more or less entangled. Thermoplastic binders are added for the permanent dimensional stabilization of the bond.

A device for preparing such moldings is described in DE-GM 93 12 868. Moldings which have equal density throughout despite differences in the wall thickness are to be prepared with this device. The material is applied for this purpose by means of a program-controlled die head to different areas of the mold in different layer thicknesses. An air flow generated by a vacuum source compacts the material applied.

The more complicated the shape of the different mold contours and the narrower the spaces in the mold, the smaller must be the die to reproduce the contours of the mold at least essentially. The smaller the die head, the longer it takes to apply the material. Furthermore, this type of introduction of the material involves the risk that the material will be deposited in a stratified form. The cause of this is the vacuum acting continuously on the material, which aligns the fiber components in parallel to the surface of the mold. After its preparation, such a molding tends to readily undergo delamination under certain circumstances, i.e., to pull apart layer by layer. In addition, it is difficult to prepare moldings with steep changes in contour, because only more or less flat piles of material are always formed by the die head, and these piles will no longer permit differences in thickness at closely spaced locations at equal density, and they are deformed in the finishing mold such that zones with different densities will be formed in an undesirable manner.

A process for preparing fiber moldings is described in WO 91/18828 A1. Fibers with thermoplastic binders are used in this case as well. A filling chamber is filled with the premixed material by means of vacuum, after which hot air flows through the filling chamber. The chamber is subsequently closed to the final material thickness and compacted. The material in the filling chamber is cooled in the next process step, and then removed. The shape of the filling chamber itself does not change in this process. This means that local differences in density in the finished part can be avoided after the pressing process to a limited extent only, because only the differences in the thickness of the molding in the filling chamber become noticeable during the deposition of the material. However, these differences in thickness are not sufficient to specifically influence the density of the material.

SUMMARY AND OBJECTS OF THE INVENTION

The primary object of the present invention is to provide a process of the above-described type, by which the material can be introduced into the mold rapidly and in such a way that consistently equal density or a density changing in a zonally defined pattern can be achieved in the molding even in the case of great variations in the wall thickness of the molding. It is another object of the present invention to provide a device for carrying out the process.

The above object is accomplished according to the present invention in a process of the above-described type by a filling contour calculated for the given molding being formed by a first mold disk set; by the filling contour being filled with the material from its open filling side; by a first (upper) finished contour molding tool being subsequently placed on the open filling side; and by a second mold disk set, whose disks are displaceable between the disks of the first mold disk set and form the second (lower) finished contour of the molding, being subsequently displaced in the first mold disk set against the first finished contour mold, while the material present in the filling contour is compacted, after which the thermal effect takes place.

One mold half of the mold has two different contours. This is brought about by two mutually interleaved sets of mold disks, wherein one mold disk set has the contour of the finished part and the other mold disk set has the contour of a filling mold. Both sets of mold disks are displaceable in relation to one another. The mold with the mold disk set of the filling contour is filled with material on the open filling side and is positioned above or under the finished part mold half (second mold half of the mold). The mold disk set of the finished contour (final contour) lifts the material out of the mold disk set of the filling contour and presses it in the correct location against this second finished part mold half. The material is mechanically compacted as a result. The thermal effect for fixing the material takes place thereafter.

The material can be rapidly introduced into the filling contour, because the filling contour, shaped according to a previous calculation, predetermines the amount of material and material distribution locally necessary for the molding. A die head for introducing the material, which can be moved in a program-controlled manner corresponding to the desired material distribution, may be replaced with a discharge of material from a fishtail die of a corresponding filling device. Great changes in thickness can also be readily reproduced in the filling contour.

By shaping the depths in the filling contour, it is possible to obtain equal densities (specific gravities) in the molding throughout or local densities (specific gravities) deviating in a defined pattern. Zonally deviating densities may be desirable, e.g., to obtain locally adapted sound insulation properties, thermal insulation properties or compressed hardnesses.

After the filling contour formed by the first mold disk set has been filled with material and the material has been precompacted by suction (vacuum), the first (upper) finished contour mold is positioned opposite the filling side, and the material is pressed against the first finished contour mold by means of the second mold disk set, which forms the second (lower) finished contour, and it is thus mechanically compacted to the final density to the desired specific gravity (density).

Heating is finally performed, during which the thermoplastic binder stabilizes the compacted material structure. The molding is finished after a subsequent cooling and can be removed from the mold.

The open filling side of the first mold disk set preferably forms a flat filling level. The filling of material into the filling contour is simple as a result, because it must be introduced only up to a flat filling level. Excess amounts of material above that level can be pushed or blown off or fall off by themselves if, as is suggested in a variant of the present invention, the filling side is open in the downward direction or to the side.

A favorable precompaction of the material in the filling contour can be achieved by blowing the material into the filling contour by means of an air flow. Uniform precompaction of the material in the filling contour is achieved by applying additional suction to the filling contour.

By blowing in or suctioning the material in an air flow at velocities of 0.5 to 3 m/sec, a specific gravity of 5 to 15 g/L can be reached in the material in the filling contour. If the calculations or experiments show that the material introduced into the filling contour assumes a specific gravity of 15 g/L, and a specific gravity of, e.g., 60 g/L shall be reached in the finished molding, a compaction factor of 4 is obtained. The filling contour is dimensioned corresponding to this compaction factor. The depths of the filling contour are consequently increased by the factor of 4 compared with the actual desired local wall thicknesses of the molding. If the depths of the filling contour are also related to a uniform filling level, we speak of a volume projection to the plane. Consistently equal volumetric density will thus be obtained in the finished molding after the compression of the material.

Locally different volumetric densities can also be achieved, if needed, in a simple manner by dimensioning the depths of the filling contour. In an embodiment of the present invention, the filling contour is dimensioned for this purpose deeper by a corresponding factor in areas of the molding on which the molding shall have a higher specific gravity than in other areas. Greater compaction of the material due to its mechanical compression is achieved in the corresponding areas by displacing the second mold disk set forming the second finished contour.

The thermal effect can be achieved by blowing hot air or steam through the compacted material through the mold having the sets of mold disks. However, the consequence of this is that the sets of mold disks are heated as well, which increases the heat consumption and makes necessary the cooling of the sets of mold disks. In addition, the sets of mold disks will then only be available for a next filling and compaction with a delay, which prevents a rapid cycle of operation of the process. To prevent a thermal effect on the sets of mold disks, the first finished contour mold carrying the compacted material is removed from the mold having the sets of mold disks before the thermal effect according to a preferred embodiment of the present invention, and a porous countermold having the second finished contour is placed on the compacted material. The loose material must be held on the mold by vacuum during this process. The thermal effect on the compacted material will then take place through the porous mold.

A device for carrying out the process is characterized in that the mold has two sets of mold disks, wherein the mold disks of the sets are arranged between each other, and the second mold disk set is displaceable in relation to the first mold disk set. The first mold disk set forms a filling contour for filling in the material. The second mold disk set forms one of the finished contours of the molding.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a schematic view of the mold along the line II—II according to FIG. 1 in a device for carrying out the process in a first position; and FIG. 3 is a schematic view of the device according to FIG. 2 in a second position of the process.

DESCRIPTION OF THE PREFERRED EMBODIMENT

Figure 1:
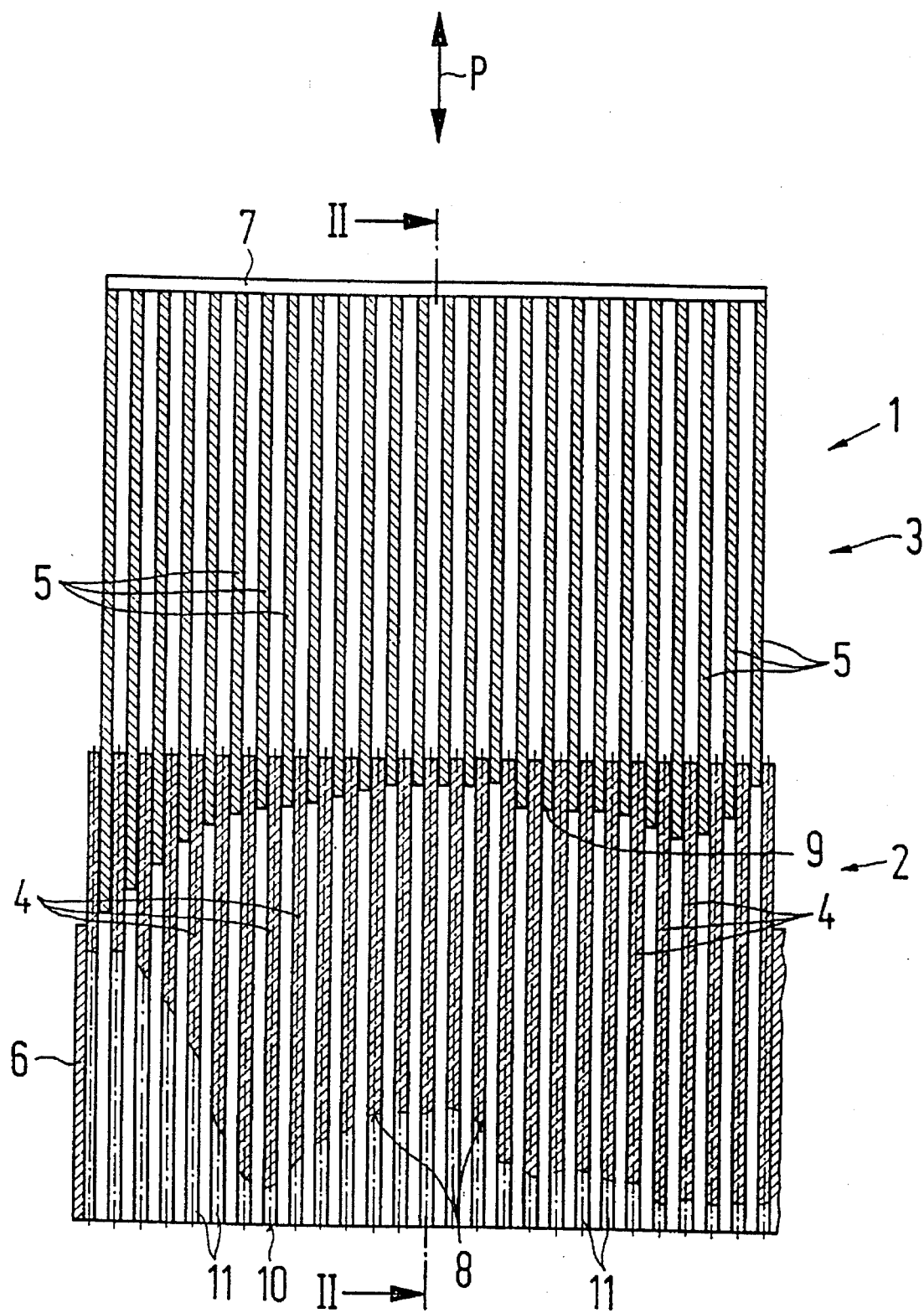
FIG. 1 is a view of a mold with two sets of mold disks.

A mold 1 has a first mold disk set 2 and a second mold disk set 3. The mold disks 4 of the first mold disk set 2 engage between mold disks 5 of the second mold disk set 3. The mold disks 4 are held on a frame 6. The mold disks 5 are fastened to a support plate 7. The support plate 7 is displaceable in relation to the frame 6 in the direction of the arrow P, so that the mold disks 5 are displaceable between the mold disks 4. The mold disks 4 are cut out such that together they form a filling contour 8. The mold disks 5 are cut out such that together they form a second (lower) finished contour 9 of the molding to be prepared.

The gaps existing between the mold disks 4, 5, which are necessary for displaceability, are selected to be so narrow that no material used may possibly penetrate between the mold disks. The thicknesses of the mold disks 4, 5 are equal and are dimensioned such that even steep changes in the thickness of the molding can be correctly reproduced. The mold disks 4, 5 are made of, e.g., aluminum plates.

The mold disk set 2 forms a downwardly open filling side with a flat filling level 10. Holding needles 11, which extend from the filling contour 8 to the filling level 10 and are parallel to the direction of arrow P, are arranged at the mold disks 4.

The second finished contour 9 is designed corresponding to the desired underside of the molding to be prepared. The filling contour 8 is dimensioned such that the material to be introduced between it and the flat filling level 10 will have the necessary specific gravity after it has been compacted to the desired extent. FIG. 2 shows, e.g., a desired thickness Y of the molding. To reach this at a desired specific gravity (density), the filling contour 8 has a depth X increased by the compaction factor in the corresponding area.

After the filling contour 8 and the second finished contour 9 of the sets of mold disks 2, 3 have been correspondingly prepared, the material is blown from below into the filling side 10 of the filling contour 8 by means of a material transportation means 12, e.g., a flexible hose head or a fishtail die (see FIG. 2). The hose head 12 may be moved more or less freely under the filling side 10 in order to achieve a uniform filling. The hose head 12 may also be designed such that it will fill the entire filling contour 8 without additional movement. The material may also be blown in directly from a processing machine, which makes the material available in the desired fibrous form, while binders are added.

Simultaneously with the blowing in of material, air is suctioned in via vacuum pipes 13, which are connected to the mold 1. This guarantees the desired precompaction of the material 14 in the filling contour 8. The material 14 is compacted in the filling contour 8 to a certain extent, e.g., to 15 g/L (see FIG. 2). The needles 11 reaching into the filling level 10 ensure that the material 14 being compacted in the filling contour 8 remains in the filling contour rather than falling off. Only material topping the filling level 10 falls off. The material located above the filling level is not held by the needles and is blown away with the air flow.

The hose head 12 is subsequently moved away, and a mold 15 forming the first (upper) finished contour 16 of the molding is moved in front of the filling side 10 (see FIG. 3). This mold 15 forms the surface of the molding, which is relatively smooth compared with the second finished contour 9 and is to be covered with a carpet. It would, however, also be possible for this first finished contour to form the structure of the molding facing the floor of the vehicle, in which case the second finished contour 9 forms the carpet-side structure of the molding.

If the mold 15 has been moved in front of the filling side 10, the second mold disk set 3 is displaced in the direction of the arrow P1 (cf. FIG. 2). The material 14 deposited in the filling contour 8 is now pressed against the first finished contour 16 of the mold 15 by means of the second finished contour 9 of the first mold disk set 3, while it is compacted into the molding 17 in the desired manner (see FIG. 3).

The compacted, preshaped molding 17 is subsequently exposed to heat, while the thermoplastic binder of the material brings about a bonding of the fibrous or flaky components and stabilization of the shape is achieved after cooling. The molding 17 is subsequently ejected in the finished form.

The thermal effect may take place directly through the mold 1. It is also possible to lift off the mold 1 from the material lying on the mold 15 before the thermal effect and to place a perforated plate, which has the second finished contour 9, on the material, and to subsequently exert the thermal effect through this plate.

It is assumed in the exemplary embodiment described that the filling side 10 is open in the downward direction. It would, however, also be possible to select such an arrangement in which the filling side 10 is open to one side.

While specific embodiments of the invention have been shown and described in detail to illustrate the application of the principles of the invention, it will be understood that the invention may be embodied otherwise without departing from such principles.

What is claimed is:

1. A process for preparing a molding from a fibrous material and a thermoplastic binder, the process comprising the steps of:

forming a filling contour calculated for the given molding to be produced by a first mold disk set;

filling the material into a mold cavity defined by said filling contour from an open filling side of said first disk set;

placing an upper finished contour mold at said open filling side;

providing a second mold disk set with disks displaceable between said disks of said first mold disk set to form a second finished contour of said molding; and subsequently displacing said first mold disk set against the first finished contour mold to compact the material present in the filling contour and subsequently bonding the material by applying heat.

2. A process according to claim 1, wherein said open filling side of said first mold disk set forms a flat filling level.

3. A process according to claim 1, wherein said material is blown into said filling contour and is suctioned in said filling contour for precompacting said material in said filling contour.

4. A process according to claim 1, wherein said filling contour is locally deeper by a compaction factor than a thickness of a resulting molding, wherein said compaction factor corresponds to a ratio of desired specific gravity of said molding to a specific gravity of said material filled into said filling contour.

5. A process according to claim 4, wherein in areas of said molding in which said molding shall have a higher specific gravity than in other areas, said filling contour is made deeper by a corresponding factor.

6. A process according to claim 1, wherein said filling side is open in a downward direction, wherein said material is introduced into said filling contour from below, and said second mold disk set is pushed from a top against said first finished contour mold placed in front of said filling side.

7. A process according to claim 1, wherein said first finished contour mold carrying said compacted material is removed from said mold having said sets of mold disks before said step of applying heat, and a perforated plate having said second finished contour is placed on said compacted material.

8. A device for preparing a molding from fibrous material and a thermoplastic binder, comprising:

a mold formed of a first set of mold disks and a second set of mold disks, mold disks of said first set of mold disks being arranged between corresponding mold disks of said second set of mold disks whereby said second set of mold disks is displaceable in relation to said first set of mold disks, said first set of mold disks defining a filling contour for filling in said material, said second set of mold disks forming one finished contour of a resulting molding.

9. A device according to claim 8, further comprising holding needles for holding said material, said holding needles extending in a plane of said mold disks of said first set of mold disks and in parallel to a direction of displacement of said second set of mold disks, said needles being arranged adjacent to said mold disks of said first set of mold disks.

10. A device according to claim 9, wherein said holding needles extend into a filling level of said filling contour.

11. A device according to claim 8, wherein said mold disks are dimensioned such that material substantially does not penetrate between them for reproducing a change in thickness of a molding in a compacted material.

\* \* \* \* \*